(No Model.) 6 Sheets—Sheet 1.
J. H. LUBBERS.
GLASS CONVEYING MECHANISM.

No. 555,048. Patented Feb. 18, 1896.

WITNESSES
INVENTOR
John H. Lubbers
by his Attorneys
W. Bakewell + Sons (No Model.) J. H. LUBBERS. 6 Sheets—Sheet 2.
GLASS CONVEYING MECHANISM.
No. 555,048. Patented Feb. 18, 1896.

WITNESSES
INVENTOR
John H. Lubbers
by his Attorneys
W. Bakewell & Sons.

(No Model.)
J. H. LUBBERS.
GLASS CONVEYING MECHANISM.
No. 555,048.
6 Sheets—Sheet 3.
Patented Feb. 18, 1896.
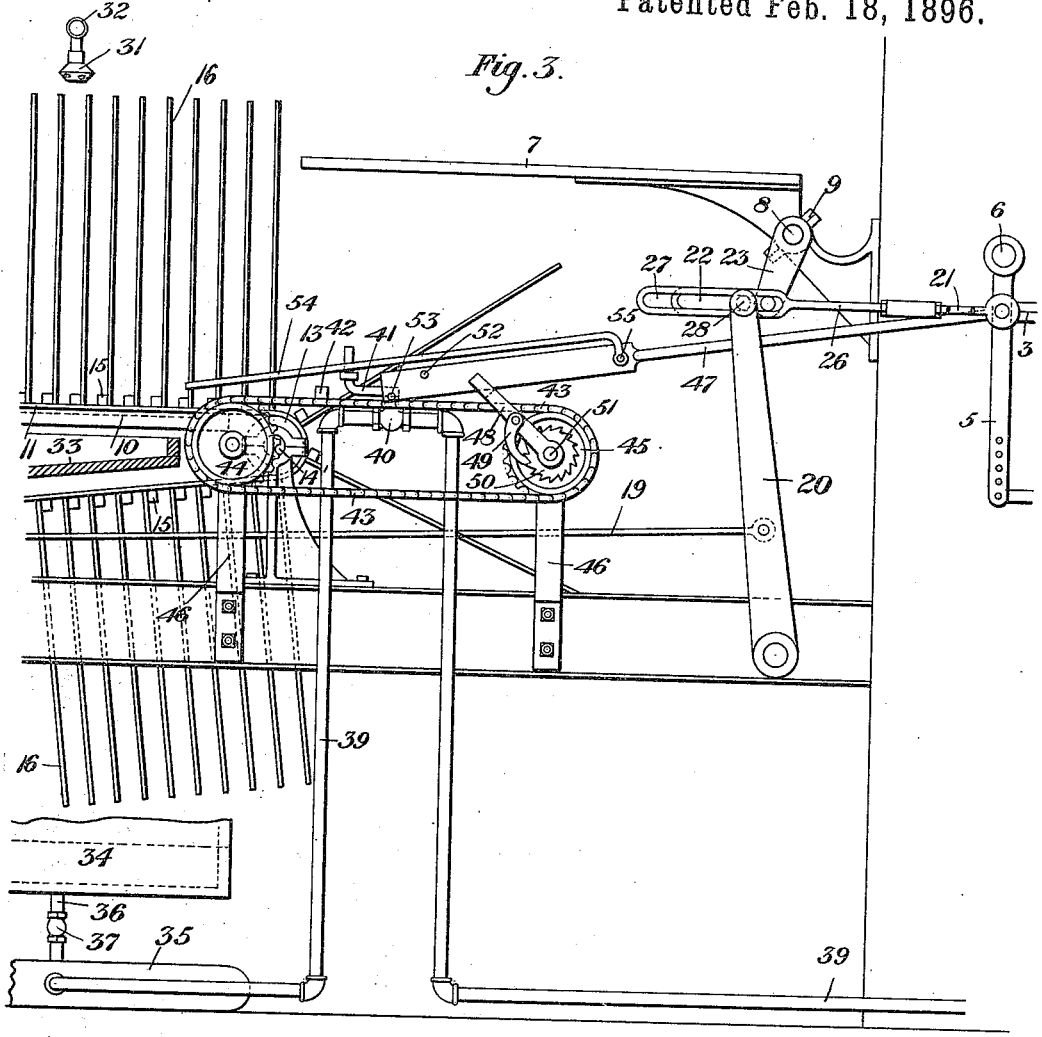
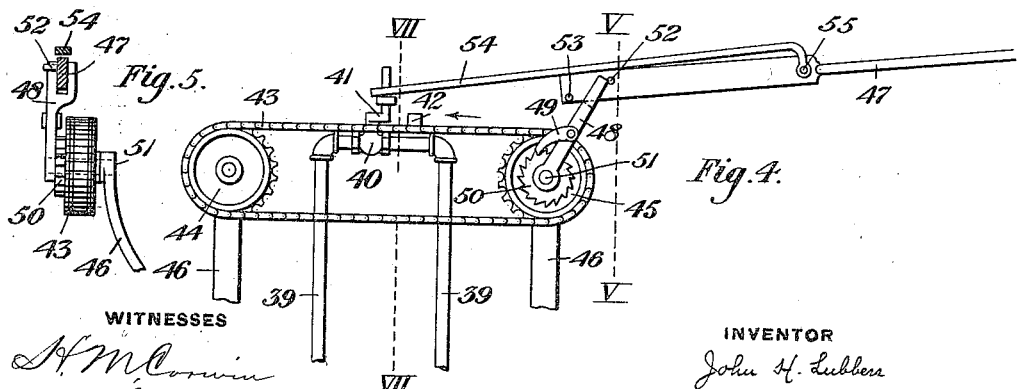
WITNESSES
INVENTOR
John H. Lubbers
by his Attorneys
W. Bakewell + Sons

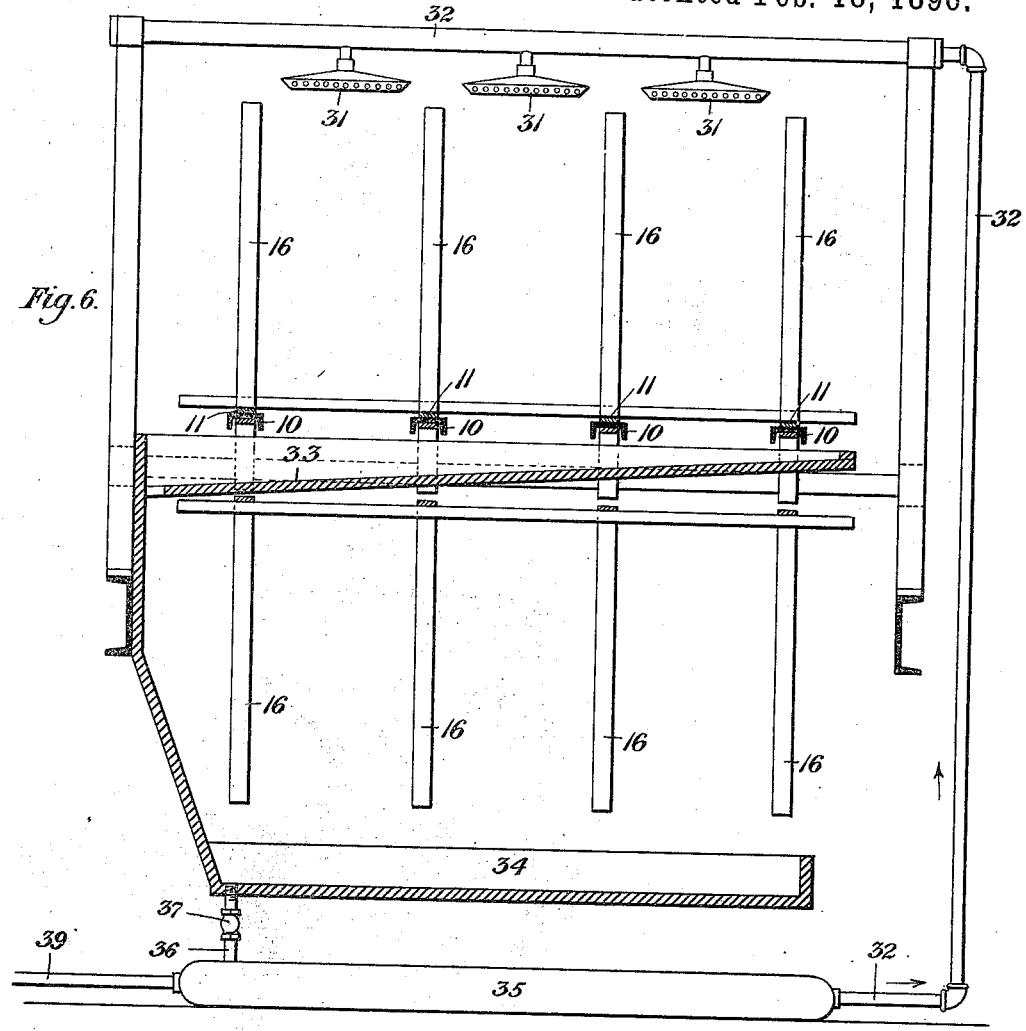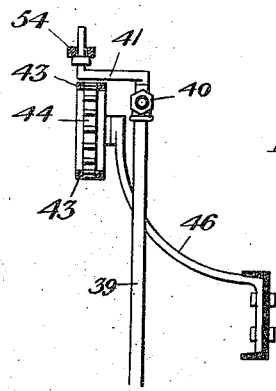

(No Model.) 6 Sheets—Sheet 5.
J. H. LUBBERS.
GLASS CONVEYING MECHANISM.
No. 555,048. Patented Feb. 18, 1896.
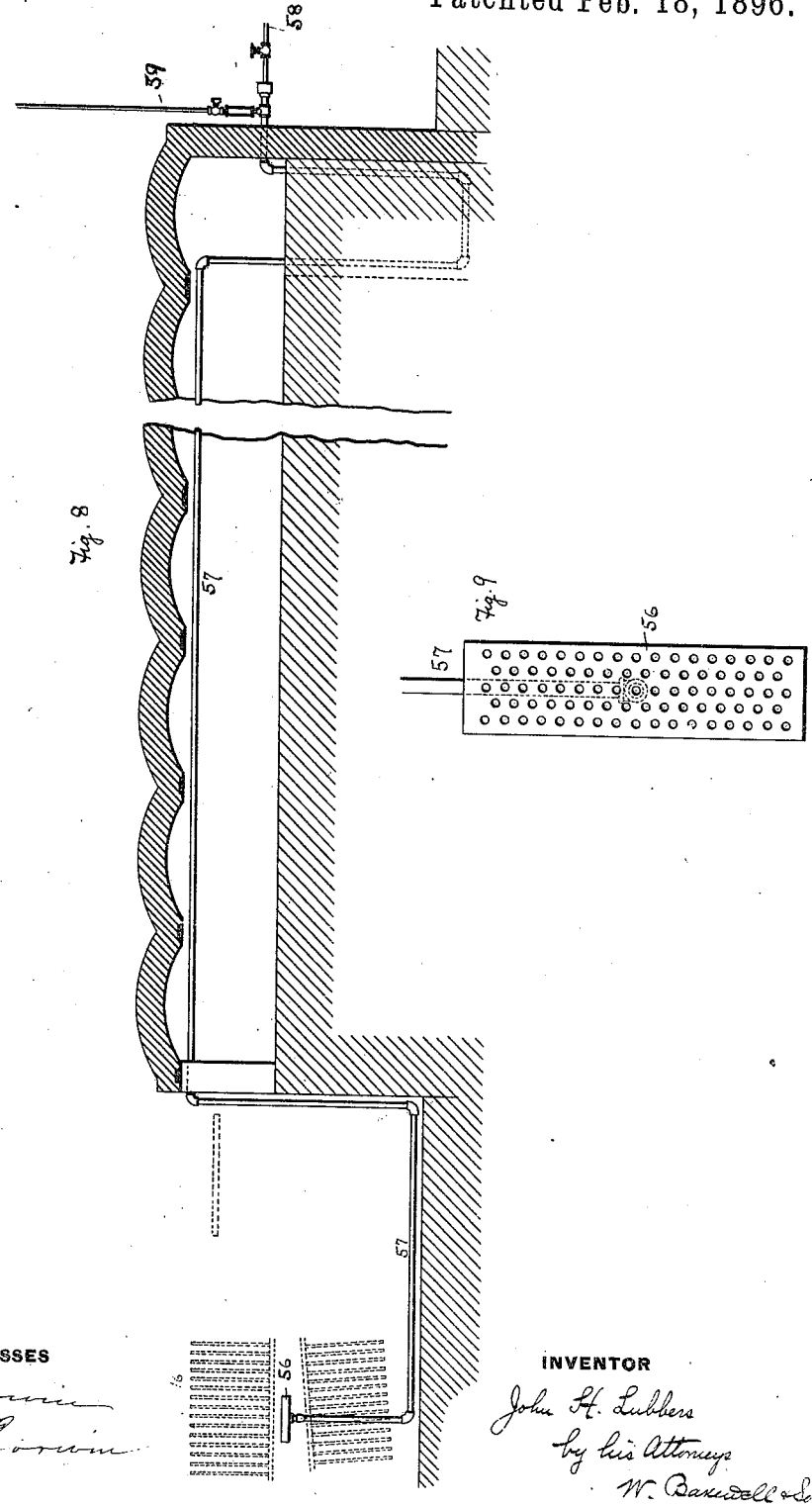

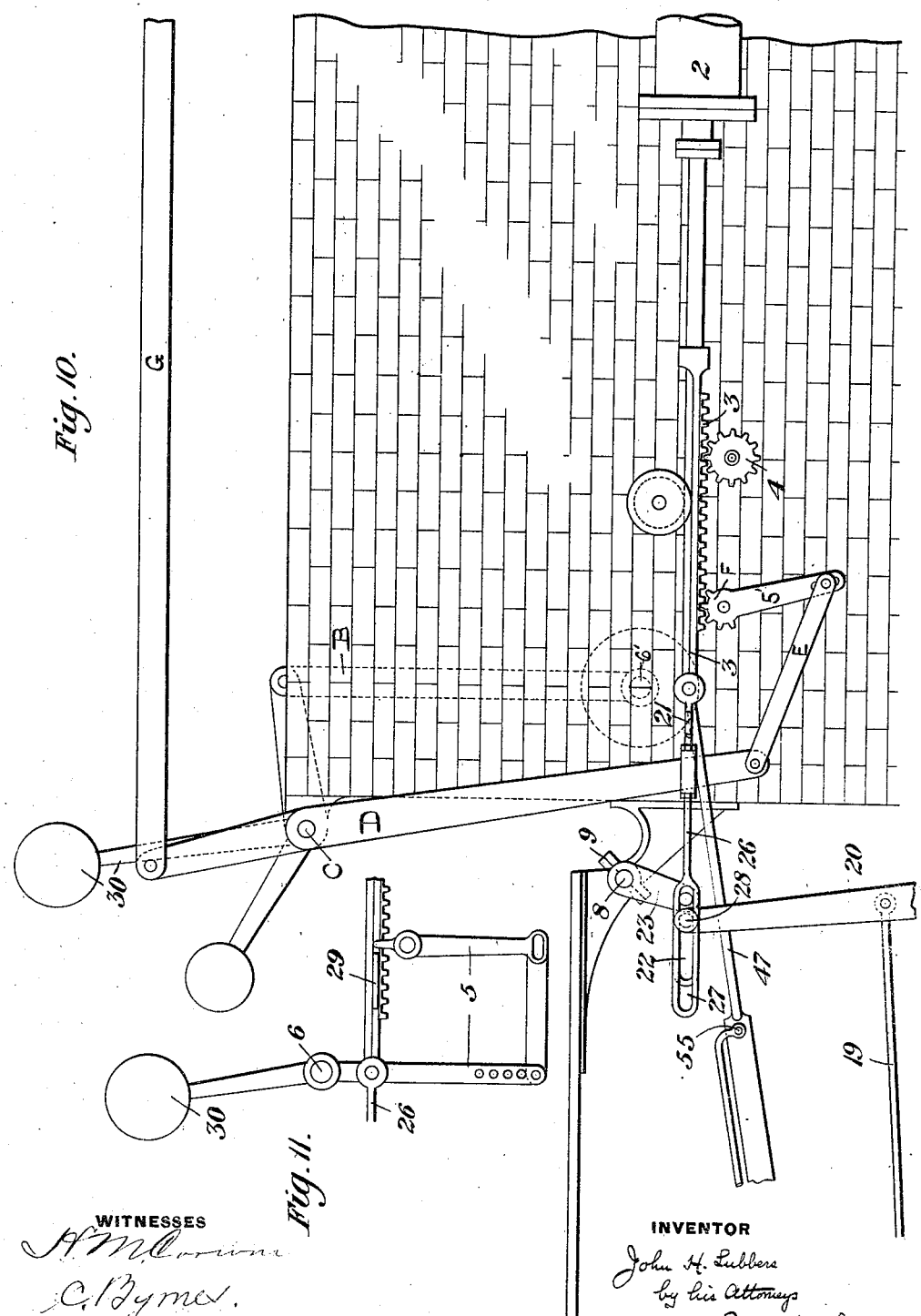

UNITED STATES PATENT OFFICE.

JOHN H. LUBBERS, OF NEW KENSINGTON, ASSIGNOR OF ONE-FIFTH TO THE DIXON-WOODS COMPANY, OF PITTSBURG, PENNSYLVANIA.

GLASS-CONVEYING MECHANISM.

SPECIFICATION forming part of Letters Patent No. 555,048, dated February 18, 1896.

Application filed May 5, 1893. Serial No. 473,178. (No model.)

*To all whom it may concern:*

Be it known that I, JOHN H. LUBBERS, of New Kensington, in the county of Westmoreland and State of Pennsylvania, have invented a new and useful Improvement in Glass-Conveying Mechanism, of which the following is a full, clear, and exact description, reference being had to the accompanying drawings, forming part of this specification, in which—

Figure 1:
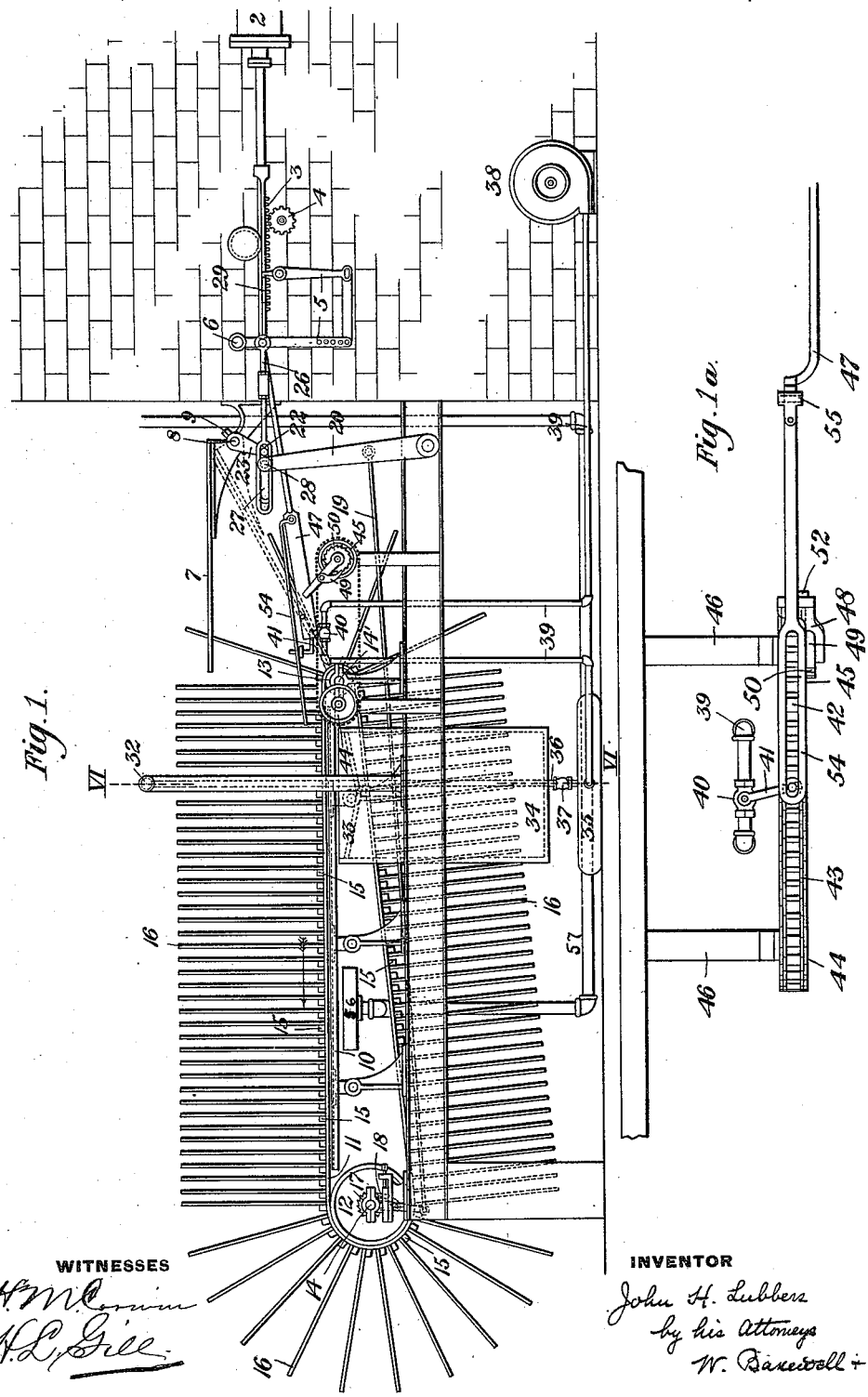
Figure 2:
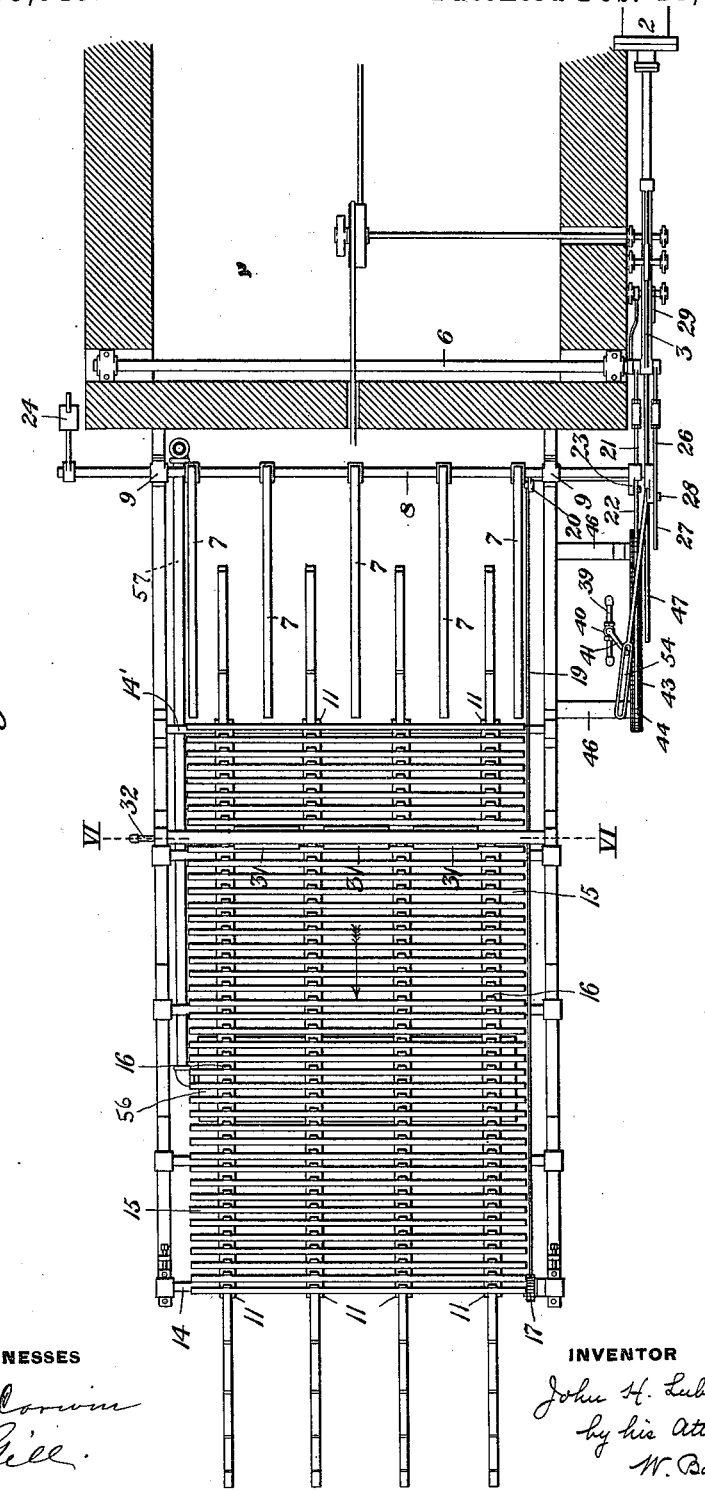

Figure 1 is a side elevation of my improved apparatus applied to the delivery end of a glass-annealing leer. Fig. 1ª is a plan view of a part. Fig. 2 is a plan view thereof, showing the end portion of the leer in horizontal section. Fig. 3 is an enlarged side view of part of the apparatus. Fig. 4 is a detail view illustrating the parts of the spraying apparatus in a position different from that shown in Fig. 3. Fig. 5 is a vertical cross-section on the line V V of Fig. 4. Fig. 6 is a vertical cross-section on the line VI VI of Figs. 1 and 2, showing the spraying apparatus. Fig. 7 is a detail view in section on the line VII VII of Fig. 4. Fig. 8 is a longitudinal vertical section of a glass-leer, showing that portion of the apparatus which is designed for drying the sheets of glass after they have passed the spraying apparatus. Fig. 9 is a detail plan view of the nozzle for discharging the drying air-blast upon the glass. Fig. 10 is a detail side elevation of the apparatus for elevating the movable conveying-bars of the leer. Fig. 11 is a side elevation of the leer, showing a modified construction of such apparatus.

Like symbols of reference indicate like parts in each of the figures.

My invention relates to an improvement in conveying mechanism for glass sheets. I have designed it principally for use in receiving the glass after it has been annealed by passage through a leer; but with suitable modifications an arrangement such as will be apparent to those skilled in the art may be employed for other purposes—for example, for transporting the glass through the leer itself.

In the drawings I show my improved apparatus used in connection with a leer having conveying mechanism of the construction described in United States Letters Patent No. 469,790, granted to me on March 1, 1892.

The glass-conveying mechanism for carrying the glass through the leer described in that patent consists of two sets of bars of iron, one a set of movable bars and the other a set of stationary bars, the mechanism being so arranged that the glass when lifted from the stationary bars by the movable bars is then advanced for a short distance by longitudinal motion of the latter. The movable bars are then depressed to deposit the glass upon the stationary bars and are pushed back to their original position, these alternate operations being continued until the glass has been carried step by step from the flattening-furnace to the delivery end of the leer. It should be understood, however, that my improvements may be applied not only to receiving glass from leers as just described, but also to leers in which the mechanism is otherwise arranged and constructed.

In the drawings, 2 represents a motor which, as described in my patent above referred to, may be used for operating the bars of the leer, being provided for that purpose with a rack 3 in gear with a pinion 4, the rotation of which effects the longitudinal motion of the movable bars, and connected by rock-levers 5 to a shaft 6, which by suitable mechanism within the leer causes the elevation of the movable set of bars at the proper time. It is not necessary here to describe more particularly this connection of the motor with the mechanism of the leer, since it does not form an essential part of the invention herein claimed.

7 is a tilting platform placed at the delivery end of the leer at the level of the bars, and consisting preferably of a series of arms which project horizontally from a rock-shaft 8, which extends across the ends of the leer and is journaled in suitable bearings 9. In their normal position the arms of the platform 7 are horizontal, as shown in Fig. 1 by full lines, but by rocking the shaft 8 they may be moved radially into a downwardly-inclined position, as shown by dotted lines in that figure. In advance of the platform 7 is a table 10, preferably composed of a series of parallel horizontal channel-beams, and on each of these there is an endless chain 11, which passes around sprocket-wheels 12 13 on shafts 14 14', journaled at or near the ends of the table. These chains are connected at intervals by a series of horizontal cross bars or strips 15, and are provided also with a series of upright bars 16, constituting frames or crates, adapted to receive between them sheets of glass and to hold the same in upright position. These chains with the horizontal cross-bars and upright bars therefore constitute in effect a car for receiving and conveying the sheets of glass. The shaft 14 is adapted to be rotated intermittently by means of a ratchet-wheel 17, whose pawl 18 is connected by an operating-rod 19 with a rock-lever 20, hereinafter described. At each back-and-forth motion of the lever 20 the reciprocation of the rod 19, acting through the pawl 18 and ratchet 17, turns the shaft 14 a partial revolution, and thus advances the chains 11 for a step in the direction of the arrows. As the upright bars 16 pass around the sprocket-wheels 13 and 12, they assume divergent positions, as shown in the drawings, but when moving on a level along the top of the table they are upright and parallel. The shaft 8 is connected with the rack 3 by means of a pitman 21, having at its end a slot connection 22, which fits over a pin at the end of a crank 23. The shaft 8 is provided with a counterweight 24, which tends to turn it so as to elevate the arms 7 into horizontal position. The lever 20 is also connected with the rack 3 by means of a pitman 26, having a slotted connection 27 fitting over a pin 28 at the end of the lever. The purpose of these slotted connections is that during a portion of the reciprocation of the rack-bar it shall have no effect upon the levers 20 and 23, but that at the ends of its stroke it shall successively engage said levers and shall move the same.

The upper end of the lever 5 projects into the path of a sliding-cam projection 29 on the rack-bar 3, the construction being such that in the back motion of the rack at the first part of said back motion the cam engages the end of the lever 5 and swings said lever on its axis, so as to turn partially the shaft 6 and to lower the movable bars. The parts are held in this position so long as in the back motion of the rack the sliding cam is in contact with the lever by means of a weight 30 applied to the shaft 6, or to any other of the shafts of the leer to lift the movable bars. Such weight is illustrated at 64 in my prior patent above mentioned. (See Fig. 11.) During the motion of the rack-bar backward, after the bars have been lowered, as above described, the motion effected by the pinion 4 retracts the movable bars. At the end of the back motion of the rack-bar the cam 29 will have passed the end of the lever 5. Near the end of the back-stroke of the rack-bar the forward end of the slot 22 on the pitman 21 engages the pin of the crank-arm 23 and moves said crank-arm so as to depress the arms 7 into the position shown by dotted lines in Fig. 1, and when said bars reach the level of that set of uprights 16 which is then projecting obliquely from the sprocket-chain, as shown in Fig. 1, the end of the slot 27 engages the pin 28 on the lever 20, and through the motion of said lever operates the ratchet-wheel 17, so as to move the sprocket-chains, and by their advance to raise the bars 16 last referred to into an upright position, moving all the other bars on the chain a step forward along the table. At the forward motion of the rack 3 the first action is the engagement of the lever 5 by the cam 29, and the rocking of said lever so as to turn the shaft 6 and to raise the movable bars in the leer above the level of the stationary bars and to lift with them all the sheets of glass, and as the rack-bar continues to advance it turns the pinion 4 so as to move the movable bars forward with the sheets of glass, and during such motion as the front end of the slot 22 moves away from the end of the pin on the crank-arm 23 the weight 24 raises the arms 7 into horizontal position, in which position they are when the movable bars, having been projected by the means above described, have reached the end of their outward motion and have carried a sheet of glass resting on the end portions of said bars directly above said arms 7. At the end of the outstroke of the rack-bar the rear end of the slot 27, engaging the pin on the lever 20, moves the pawl of the ratchet 17 into position for another bite on the ratchet.

On the next back motion of the rack-bar 3, by the means above described, the conveying-bars of the leer are first lowered, so as to deposit the glass sheet on the then horizontal arms 7, and the movable bars are next moved back longitudinally within the leer out of the path of the arms 7, which then move down toward the then inclined bars 16, on which the glass sheet is deposited. The next motion is the operation of the ratchet-wheel and the actuating of the sprocket-chains, which advance all the bars 16 one step forward and raise the inclined bars 16, which bear the glass into upright position.

The operation of the machine is thus continued successively as above described, each motion of the sprocket-chain advancing the glass sheets in series along the table 10, and when a number of sheets have accumulated on the table and after they have passed the spraying mechanism hereinafter described they are removed by a man and carried on a car or by other device to the cutting-room. By means of this mechanism I am enabled to dispense with the necessity of having a man standing at the delivery end of the leer constantly to remove the glass sheet, and it enables one leer-tender to tend several leers. The cylinder 2, which operates the mechanism above described, may be controlled by a suitable valve operated by a flattener, who stands at the flattening-furnace at the receiving end of the leer.

In order to wash the sheets of glass before they are removed from the table 10, I employ a spraying apparatus, comprising a series of discharge-nozzles 31, connected with and supplied by a water-pipe 32 and arranged directly over the table. Beneath these nozzles and beneath the upper strands of the endless sprocket-chain is a chute 33, adapted to catch the water after it has washed the glass and conduct it to a trough 34, from which it flows into an air-tight reservoir 35 through a pipe 36 controlled by a check-valve 37. This reservoir also connects with the supply-pipe 32, so that the acidulated water is used over and over again for washing the glass. It is preferably forced up through the pipe 32 to the nozzles by means of compressed air delivered intermittently into the reservoir 35 from an air pump or blower 38, so that at desired intervals when the air-pressure is supplied the water shall be discharged from the nozzles. The intermittent discharge is secured by providing the air-pipe 39 with a valve 40, having a stem 41 projecting into the path of a lug 42, secured to the endless chain 43, carried on wheels 44 45, mounted on brackets 46, secured to the main frame. The bar 47 is pivotally attached to the rack-bar 3, and at its forward end is made to pass between the forked ends of the pawl-arm 48, carrying the pawl 49, engaging the ratchet-wheel 50, mounted on the shaft 51 carrying the wheel 45. In its forward motion the pin 52 on the bar 47 will engage the arm 48, moving the sprocket-wheel and carrying the chain forward until the pin 52 rides over the top of the arm, as shown in Fig. 3, and in its back stroke the pin 53, preferably located somewhat below the pin 52, will engage the arm 48 and return it to its normal position. Thus by successive operations the chain 43 and the lug 42 will be caused to make complete revolutions, at each one of which the valve-stem 41 will be engaged, opening the valve, and thereby operating the spraying-nozzle until it is closed at the back stroke of the rack-bar 3. This is accomplished by the slotted arm 54, pivotally attached to the bar 47 at 55, engaging the upturned end of the valve-stem 41 and returning it to the position shown in Figs. 1ª and 4, thereby closing the valve.

For the purpose of drying the glass after it has passed the spraying apparatus and before it has been removed from the conveying mechanism I employ an air-discharging nozzle or chamber 56, which is arranged under the table 10 betwen the discharge end of said table and the spraying mechanism and between the upper and lower strands of the endless chains. Said discharge-nozzle communicates with an air-supply pipe 57, which leads through the leer, as shown in Fig. 8, near the top thereof in a place exposed to heat, and is connected with a pipe 58 which supplies thereto air under pressure. It is also preferably connected with a pipe 59 which supplies a small quantity of steam or water thereto. In operation, the air passes through the pipe 57 with the steam or water, the water is vaporized thereby and the air and steam are discharged through the nozzle 56 upon the sheets of glass, and as the air is in a heated condition it rapidly dries the glass and brings it into proper condition to be removed from the table and to be taken to the cutting-room. This part of the apparatus forms a very desirable feature of my improvement.

In Fig. 10 I show parts of the apparatus described above used with leer mechanism constructed precisely as shown in my prior patent, No. 469,790, said construction being generally and substantially the same, but in some details different from that shown in Fig. 11. In Fig. 10 the shafts 6' on which the movable bars are supported are upheld by hangers B (shown by dotted lines) extending from the crank-arms of counterweighted shafts C. The shaft C at the end of the leer is connected by a lever D and link E to the lever 5', which, by a toothed segment F, is connected with the rack 3, and the several shafts C along the leer are connected by a bar G, so that all will work in unison. The shaft C has also a counterweighted arm 30, which is upright, but not exactly vertical. When the rack-bar 3 is projected, the lever D is rocked, and thereby through the shaft C and hangers B the conveying-bars of the leer are raised, and on the retraction of the rack-bar they are lowered. In each such motion of the rack-bar the weighted arm 30' is moved from one side of a vertical line to the other and thus serves to hold the bars elevated or depressed, as the case may be.

I claim—

1. In glass-conveying mechanism, the combination of an endless chain or belt having projecting bars affording glass-receiving spaces, the adjacent bars being separate from each other but sufficiently close together to hold interposed glass sheets in substantially upright position, and being adapted to diverge at the turning-points of the endless belts so as to receive the glass sheets; and mechanism situate at one of said turning-points, and adapted to deliver the glass sheets to the bars when the latter are in divergent positions; substantially as described.

2. The combination with a glass-annealing leer, of an endless chain or belt leading outside the leer from the delivery end of the leer at which it has one of its turning-points, and having projecting bars affording glass-receiving spaces, said bars being adapted to diverge at the turning-points of the endless belt, to receive the glass sheets from the leer; substantially as described.

3. A glass-conveying table having means for carrying the glass in upright position, and spraying mechanism adapted to discharge upon the glass; substantially as described.

4. A glass-conveying table having means for carrying the glass, a spraying-pipe, a valve controlling the discharge of water therethrough, and mechanism adapted to operate the valve intermittently; substantially as described.

5. A glass-conveying table, having means for carrying the glass, a spraying-pipe, a valve controlling the discharge of water therethrough, and mechanism adapted to operate the valve intermittently, said mechanism being connected with and operated by the mechanism which operates the conveyer; substantially as described.

6. A glass-conveying table having means for carrying the glass, a valve-controlled spray-pipe adapted to discharge upon the glass, a water-reservoir connected with the pipe, a blower adapted to force the water from the reservoir through the pipe, and a valve-controlled return-pipe adapted to return the waste water to the reservoir; substantially as described.

7. The combination with a glass-annealing leer, having at its discharge end a tilting receiving-platform, an endless chain or belt having projecting bars, wheels around which it travels, and mechanism adapted to tilt the platform into the path of the bars as they pass around one of the wheels; substantially as described.

8. The combination with a glass-annealing leer, having at its discharge end a tilting receiving-platform, an endless chain or belt having projecting-bars, wheels around which it travels, mechanism adapted to tilt the platform into the path of the bars as they pass around one of the wheels, a motor which operates the glass-conveying mechanism of the leer, and a mechanical connection between the motor and the tilting platform, adapted to operate the same after the glass has been deposited upon the platform; substantially as described.

9. Glass-conveying mechanism having means for carrying the glass, spraying mechanism adapted to discharge upon the glass, and a pipe discharging a drying-blast upon the glass after it has passed the spraying mechanism; substantially as described.

10. Glass-conveying mechanism, having means for carrying the glass, spraying mechanism adapted to discharge upon the glass, and a pipe discharging a drying-blast upon the glass after it has passed the spraying mechanism, in combination with an annealing-leer through which said pipe passes for the purpose of heating the blast; substantially as described.

In testimony whereof I have hereunto set my hand.

J. H. LUBBERS.

Witnesses:
   THOMAS W. BAKEWELL,
   W. B. CORWIN.